(12) United States Patent
Gray et al.

(10) Patent No.: US 10,674,183 B2
(45) Date of Patent: *Jun. 2, 2020

(54) SYSTEM AND METHOD FOR PERSPECTIVE SWITCHING DURING VIDEO ACCESS

(71) Applicant: International Business Machines Corporation, Armonk, NY (US)

(72) Inventors: Maurice F. Gray, Whitchurch (GB); Sarah Gray, Whitchurch (GB); Gordon D. Hutchison, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/550,727

(22) Filed: Aug. 26, 2019

(65) Prior Publication Data
US 2019/0379919 A1    Dec. 12, 2019

Related U.S. Application Data

(63) Continuation of application No. 15/438,920, filed on Feb. 22, 2017, now Pat. No. 10,448,063.

(51) Int. Cl.
*H04N 21/262* (2011.01)
*H04N 21/234* (2011.01)
(Continued)

(52) U.S. Cl.
CPC ... *H04N 21/23418* (2013.01); *H04N 21/2353* (2013.01); *H04N 21/23109* (2013.01);
(Continued)

(58) Field of Classification Search
CPC ............. H04N 21/816; H04N 21/2743; H04N 21/23424; H04N 21/84; H04N 21/23418;
(Continued)

(56) References Cited

U.S. PATENT DOCUMENTS 6,243,085 B1    6/2001 Roach
8,220,022 B1    7/2012 Pan et al.
(Continued)

OTHER PUBLICATIONS

Unknown, "OpenCV: Face Recognition", http://docs.opencv.org/trunk/db/d7c/group_face.html, Mar. 29, 2015, 3 pgs.
(Continued)

*Primary Examiner* — Junior O Mendoza
(74) *Attorney, Agent, or Firm* — William H. Hartwell; Maxine L. Barasch; Keohane & D'Alessandro PLLC

(57) ABSTRACT

A system comprises a video hosting subsystem configured to access a database of video streams. The video hosting subsystem comprises a processor for processing data associated with the video streams, and memory for storing data. The processor is configured to receive a user request to access a selected primary video stream. The processor is further configured to identify other video streams captured at substantially the same time and location as the selected primary video stream and in which a person specified in the user request appears. The processor is configured to select, from the identified other video streams, an alternative video stream. The processor is further configured to provide the user with access to the selected primary video stream, together with an option to access the alternative video stream.

20 Claims, 6 Drawing Sheets

(51) Int. Cl.
   *H04N 21/235* (2011.01)
   *H04N 21/231* (2011.01)
   *H04N 21/81* (2011.01)
   *H04N 21/2743* (2011.01)
   *H04N 21/84* (2011.01)
   *H04N 21/25* (2011.01)

(52) U.S. Cl.
   CPC ..... *H04N 21/23424* (2013.01); *H04N 21/251* (2013.01); *H04N 21/26258* (2013.01); *H04N 21/2743* (2013.01); *H04N 21/816* (2013.01); *H04N 21/84* (2013.01)

(58) Field of Classification Search
   CPC ........... H04N 21/23109; H04N 21/251; H04N 21/26258; H04N 21/2353
   See application file for complete search history.

(56) References Cited

U.S. PATENT DOCUMENTS

| | | | |
|---|---|---|---|
| 8,291,452 B1 | 10/2012 | Yong et al. | |
| 8,494,231 B2 | 7/2013 | Folta et al. | |
| 8,683,067 B2 | 3/2014 | Herz | |
| 9,402,090 B1 | 7/2016 | Bliss et al. | |
| 10,448,063 B2 * | 10/2019 | Gray | H04N 21/23424 |
| 2004/0049401 A1 | 3/2004 | Carr et al. | |
| 2009/0019484 A1 | 1/2009 | Jo et al. | |
| 2012/0162436 A1 | 6/2012 | Cordell et al. | |
| 2012/0263439 A1 | 10/2012 | Lassman et al. | |
| 2013/0148898 A1 | 6/2013 | Mitura et al. | |
| 2013/0202265 A1 * | 8/2013 | Arrasvuori | H04N 5/77 386/224 |
| 2014/0052738 A1 * | 2/2014 | Connell-Giammatteo | G11B 27/031 707/748 |
| 2015/0143239 A1 * | 5/2015 | Birkbeck | G06F 3/0484 715/716 |
| 2015/0201134 A1 | 7/2015 | Carr et al. | |
| 2015/0222815 A1 * | 8/2015 | Wang | G11B 27/031 348/36 |
| 2015/0293995 A1 | 10/2015 | Chen et al. | |
| 2015/0319506 A1 | 11/2015 | Kansara et al. | |
| 2016/0014435 A1 | 1/2016 | Cronin et al. | |
| 2016/0034712 A1 | 2/2016 | Patton et al. | |
| 2016/0080649 A1 | 3/2016 | Bex et al. | |
| 2016/0155475 A1 | 6/2016 | Hamer | |
| 2016/0247537 A1 | 8/2016 | Ricciardi | |
| 2017/0187833 A1 * | 6/2017 | Chedeau | H04L 67/306 |
| 2018/0242027 A1 | 8/2018 | Gray et al. | |

OTHER PUBLICATIONS

Wikipedia, "Lady in the Lake", https://en.wikipedia.orgiwiki/Lady_in_the_Lake, Nov. 24, 2016, 3 pgs.

Hiroki Nomiya et al., "Impressive Scene Detection from Lifelog Videos by Unsupervised Facial Expression Recognition", IEEE, Jul. 2013, 3 pgs.

Unknown, "Hobnob: Wirewax Restful API", http://hobnob.wirewax.com/docs/, Jan. 18, 2017, 27 pgs.

D'Cruze-Sharpe, "Best cameras for lifelogging: How to livestream your life on the move", Apr. 13, 2016, 9 pgs.

Zax, David, "Google Glass and the Rise of POV", May 1, 2013, 4 pgs.

Unknown, "Cloud Vision API: Derive insight from images with our powerful Cloud vision API", Google Cout Platform, Jan. 18, 2017, 12 pgs.

Casalboni, Alex, "Google Vision API: Image Analysis as a Service", Cloud Academy Blog, Jan. 28, 2016, 13 pgs.

Oleg Asanbayev, USPTO Office Action, U.S. Appl. No. 15/438,920, dated Nov. 3, 2017, 24 pages.

Oleg Asanbayev, USPTO Final Office Action, U.S. Appl. No. 15/438,920, dated Mar. 29, 2018, 18 pages.

Oleg Asanbayev, USPTO Office Action, U.S. Appl. No. 15/438,920, dated Jul. 20, 2018, 14 pages.

Junior O. Mendoza, USPTO Final Office Action, U.S. Appl. No. 15/438,920, dated Nov. 23, 2018, 19 pages.

Junior O. Mendoza, USPTO Notice of Allowance and Fee(s) Due, U.S. Appl. No. 15/438,920, dated May 28, 2019, 9 pages.

* cited by examiner

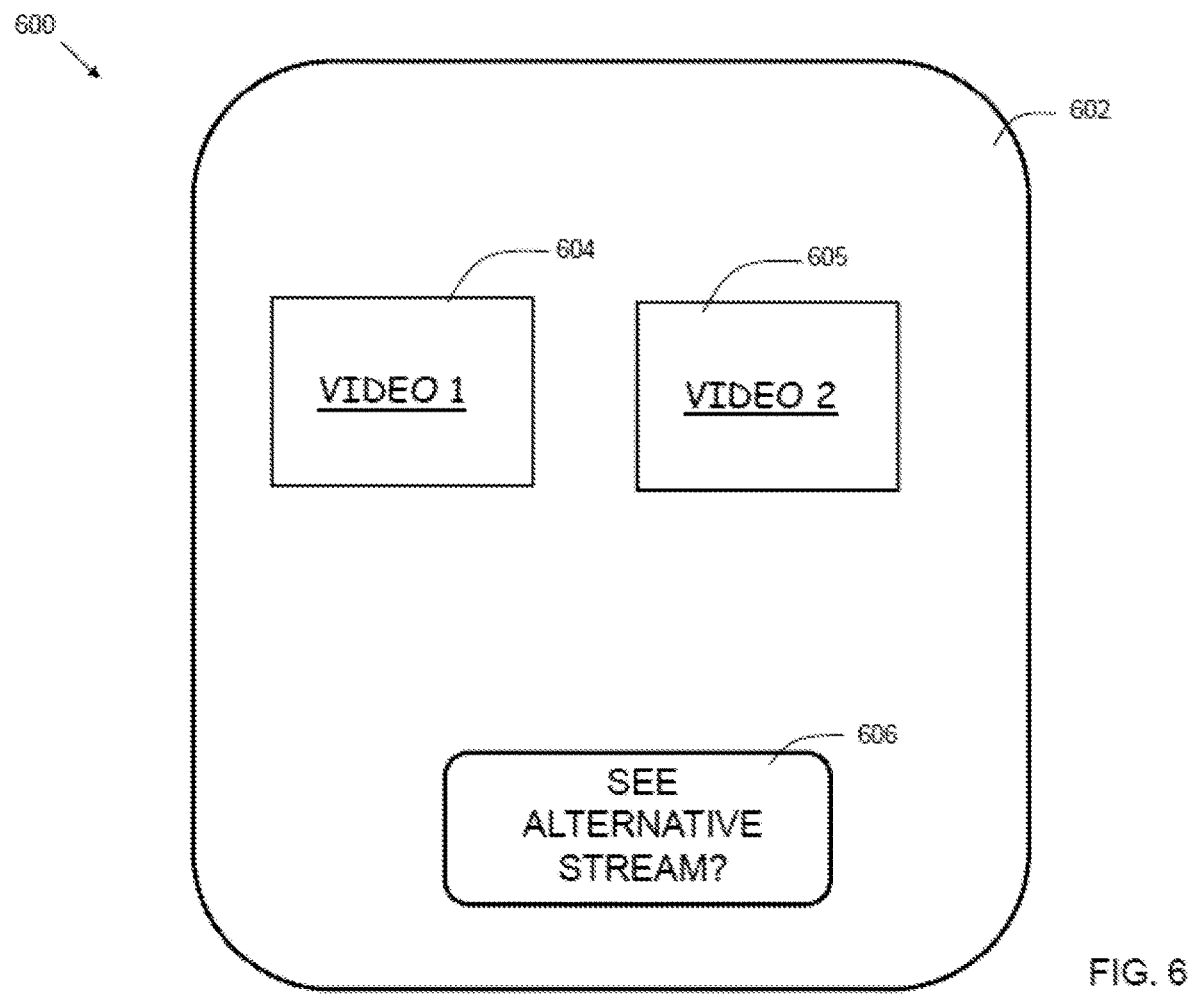

SYSTEM AND METHOD FOR PERSPECTIVE SWITCHING DURING VIDEO ACCESS

RELATED APPLICATION DATA

The present patent document is a continuation of U.S. patent application Ser. No. 15/438,920, filed Feb. 22, 2017, entitled "SYSTEM AND METHOD FOR PERSPECTIVE SWITCHING DURING VIDEO ACCESS", the entire contents of which is incorporated herein by reference.

BACKGROUND

The present disclosure relates to the processing and use of a video stream of moving images, and, more specifically, to perspective switching when accessing a video stream.

SUMMARY

According to an aspect of the present disclosure, a computer implemented method is provided. The method receives a user request to access a selected primary video stream. The method further identifies other video streams captured at substantially the same time and location as the primary video stream and in which a person specified in the user request appears. The method selects, from the identified other video streams, an alternative video stream. The method provides the user with access to the selected primary video stream, together with an option to access the alternative video stream.

According to another aspect of the present disclosure, a system is provided. The system comprises a video hosting subsystem configured to access a database of video streams. The video hosting subsystem comprises a processor for processing data associated with the video streams, and memory for storing data. The processor is configured to receive a user request to access a selected primary video stream. The processor is further configured to identify other video streams captured at substantially the same time and location as the selected primary video stream and in which a person specified in the user request appears. The processor is configured to select, from the identified other video streams, an alternative video stream. The processor is further configured to provide the user with access to the selected primary video stream, together with an option to access the alternative video stream.

According to yet another aspect of the present disclosure, a computer program product is provided. The computer program product comprises a computer readable storage medium having program instructions embodied therewith. The program instructions are executable by a processor to cause the processor to: receive a user request to access a selected primary video stream; identify other video streams captured at substantially the same time and location as the selected primary video stream and in which a person specified in the user request appears; select, from the identified other video streams, an alternative video stream, and provide the user with access to the selected primary video stream, together with an option to access the alternative video stream.

BRIEF DESCRIPTION OF THE SEVERAL VIEWS OF THE DRAWINGS

Example implementations of the present disclosure will be described below with reference to the following drawings, in which:

FIG. 6 is a diagram of an example user interface of a user device.

DETAILED DESCRIPTION

Figure 1:
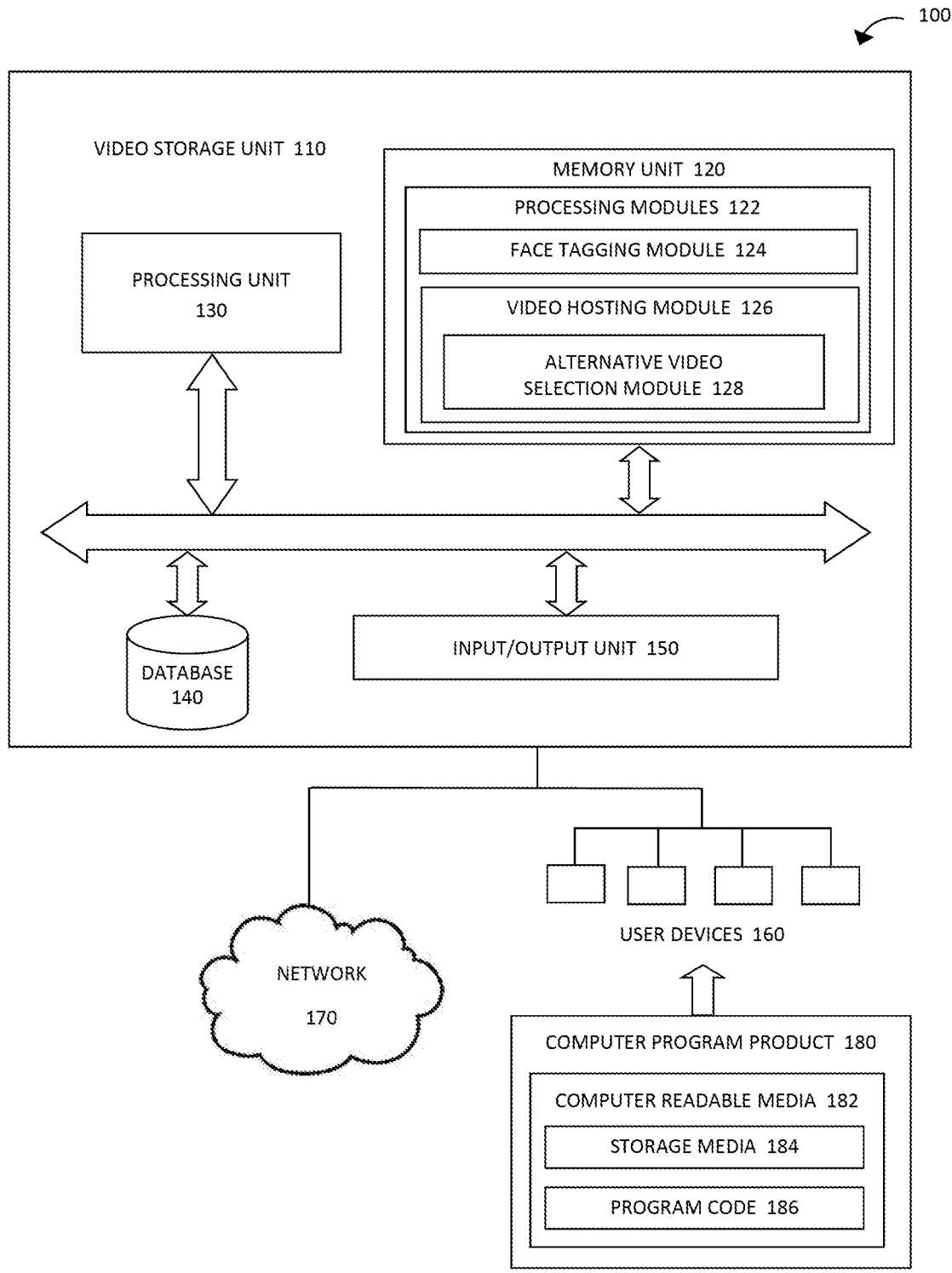
FIG. 1 is a block diagram of a system in accordance with example implementations of the present disclosure.

In the following description, the terms "video stream" and "video" are intended to encompass video data comprising a time ordered sequence of video frames, designed to be viewed as moving images, in any standard or proprietary video data format and stored and/or conveyed using any suitable video communications system.

Example implementations of the present disclosure include systems, methods and computer program products for providing user access to video streams. The disclosed example implementations may be used for enabling a user to switch a perspective or viewpoint of video content at a particular point in time, as described in further detail below. Unless otherwise stated, in the following description, references to time are intended to encompass both points in time and time ranges and references to location are intended to encompass a precise geographical location and locations within a distance range. In the drawings, the same or similar features are assigned the same or similar reference numerals.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, integers, steps, operations, elements, components, and/or groups thereof.

FIG. 1 is a block diagram of a system 100 in accordance with example implementations of the present disclosure. In particular, system 100 comprises a video storage unit 110 configured to receive, process and store video content, in the form of video streams (e.g., video clips and compilations), communicated from a plurality of users for subsequent use as described below. Generally, video storage unit 110 may comprise a plurality of modules, components and/or subsystems for processing video streams. System 100 may form part of a video hosting service for storing video streams received from multiple users, and providing access to those video streams to multiple users, as described below.

As shown in FIG. 1, video storage unit 110 comprises memory unit 120, processing unit 130, database 140 and input/output (I/O) unit 150. I/O unit 150 is configured to receive input video data comprising video streams from a plurality of users via user devices 160 directly connected to the video storage system or over a network 170 (e.g., the Internet). Processing unit 130 is configured to process input video stream data received via I/O unit 150 and store the processed data in database 140. For example, processing unit 130 may reformat the received video stream in a predefined format for the database 140 and/or add metadata to the video stream data prior to storage in database 140. Processing unit 130 may perform processing by executing instructions stored in one or more processing modules 122 of memory unit 120 or otherwise may be configured to perform processing, as described below.

In accordance with example implementations of the present disclosure, processing unit 130 may perform face tagging by executing instructions stored in a face tagging module 124 of processing modules 122 of memory unit 120. As well known to the skilled person, face tagging utilizes facial recognition technology to recognize human faces detected in images or video frames and adds metadata or "tags" to the corresponding images or video frames.

In example implementations of the present disclosure, processing unit 130 may be configured to perform automatic face tagging of the input video data. Automatic face tagging may be performed using any suitable technique, whether now known or developed in the future.

Processing unit 130 may be configured to perform face tagging by adding metadata (i.e., tags) to each processed video frame having one or more identified faces. In accordance with example implementations of the present disclosure, the metadata may comprise a facial recognition identifier, such as a hashcode. The facial recognition identifier may be a predefined standard or proprietary code representing a face of a subject for use with the database 140. For example, the facial recognition identifier may be a hashcode generated from one or more facial images of a particular subject using a predefined algorithm. As the skilled person will appreciate, the present disclosure is not limited to use with a particular type of identifier or hashcode, but may be implemented with any suitable code or signature for facial recognition, whether now known or developed in the future.

In example implementations of the present disclosure, database 140 is configured to store facial recognition hashcodes of a predefined type for a plurality of known subjects (e.g., derived from profile photographs thereof). Each facial recognition hashcode may be associated with a corresponding subject identifier (e.g., user ID). The facial recognition hashcodes stored in database 140 may be used for face tagging, as discussed above. In addition, database 140 is configured to store processed input video streams with associated metadata. As the skilled person will appreciate, in other implementations, facial recognition identifiers (e.g., hashcodes) may be stored in a separate database from the database storing the video streams.

In accordance with example implementations of the present disclosure, video storage unit 110 may form part of a web-based video hosting service or similar server-based system. In particular, a plurality of users (e.g., subscribers to the video hosting service) may upload video streams of captured video content to the video storage unit 110. An uploaded video stream data may comprise unedited video content, which may be uploaded substantially in real time with capture thereof or at a later time. The uploaded data may further include associated metadata such as an identifier for the user (e.g., subject ID of the person who captured the video stream), time and location information of the video stream, and, optionally, an identifier of one or more subjects present in the images of the video stream. Processing unit 130 may perform near real time processing of uploaded video streams, thereby enabling the video content to be available for immediate sharing and use, as described below. Video storage unit 110 may further allow users to access (e.g., download, edit and/or play) video streams, which they have uploaded themselves or which have been uploaded by one or more other users, in accordance with a video hosting service. In example implementations of the present disclosure, processing unit 30 may perform video hosting processes by executing instructions of a video hosting module 126 of processing modules 122 of memory unit 120. In particular, video hosting module 126 may provide a user with access to a requested video stream and provide the user with an option to access an alternative video stream that provides a different perspective of the video content, for example by executing instructions stored in of an alternative video selection module 128 of the video hosting module 126.

In example implementations of the present disclosure, a computer program product 180 may be provided, as shown in FIG. 1. The computer program product 180 may include a computer readable media 182 having storage media 184 and program instructions 186 (i.e., program code) embodied therewith. The program instructions 186 may be loaded onto memory unit 120 of video storage unit 110 via I/O unit 150, for example by one of user devices 160. The program instructions 186 may comprise any one or more of the above-described processing modules 122, including face tagging module 124, video hosting module 126 and alternative video selection module 128 of video storage unit 110. The program instructions 186 may be executable by the processing unit 130 of video storage unit 110 to perform methods for processing video streams as described below with reference to FIGS. 2, 3 and 4.

As the skilled person will appreciate, the system of FIG. 1 is illustrative only and may be varied according to application and/or user requirements. For example, the database may comprise multiple databases and may be implemented separately from the processing components. Moreover, each of the above described processes, namely the face tagging, video hosting and alternative video selection processes, may be implemented by separate subsystems, each having an associated memory unit and processing unit.

Figure 2:
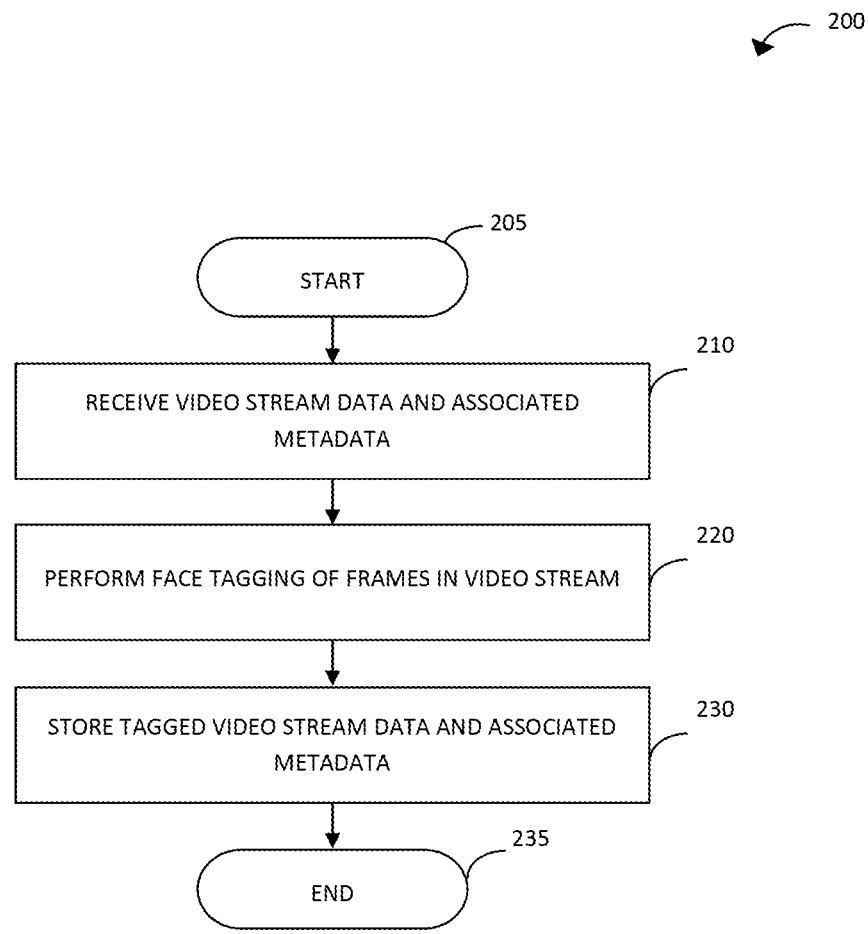
FIG. 2 is a flowchart of a method for processing video data in accordance with example implementations of the present disclosure.

FIG. 2 is a flowchart of a method 200 for processing video data in accordance with example implementations of the present disclosure. In particular, although not exclusively, method 200 may be performed by processing unit 130 in accordance with face tagging module 124 of memory unit 120 of the video storage unit 110 of FIG. 1.

The method 200 starts at step 205. At step 210, the method receives video stream data from a user and any associated metadata. As described above, the video stream data may be uploaded by a user in any suitable video data format and may include metadata such as an identifier of the user, who is typically the person who captured the video stream. The video stream data may also include metadata such as time and location information, which may be automatically attached to the video stream data by the video capture device or may be manually added by the user. The user may also provide metadata such as identifiers for one or more of the subjects who appear in the video stream and, if appropriate, an identifier for the person who captured the video stream.

At step 220, the method performs face tagging of video frames of the video stream using any suitable technique. Examples of face tagging techniques are well known to the skilled person, as described above.

At step 230, the method stores the received video stream data with the face-tagging data for video frames and any other associated metadata in data storage, such as a database. The method then ends at step 235.

As the skilled person will appreciate, the method 200 of FIG. 2 may be performed on all video streams uploaded to a video storage unit or the like. Thus, the method 200 may be performed sequentially or concurrently on multiple video streams uploaded from multiple different users.

Figure 3:
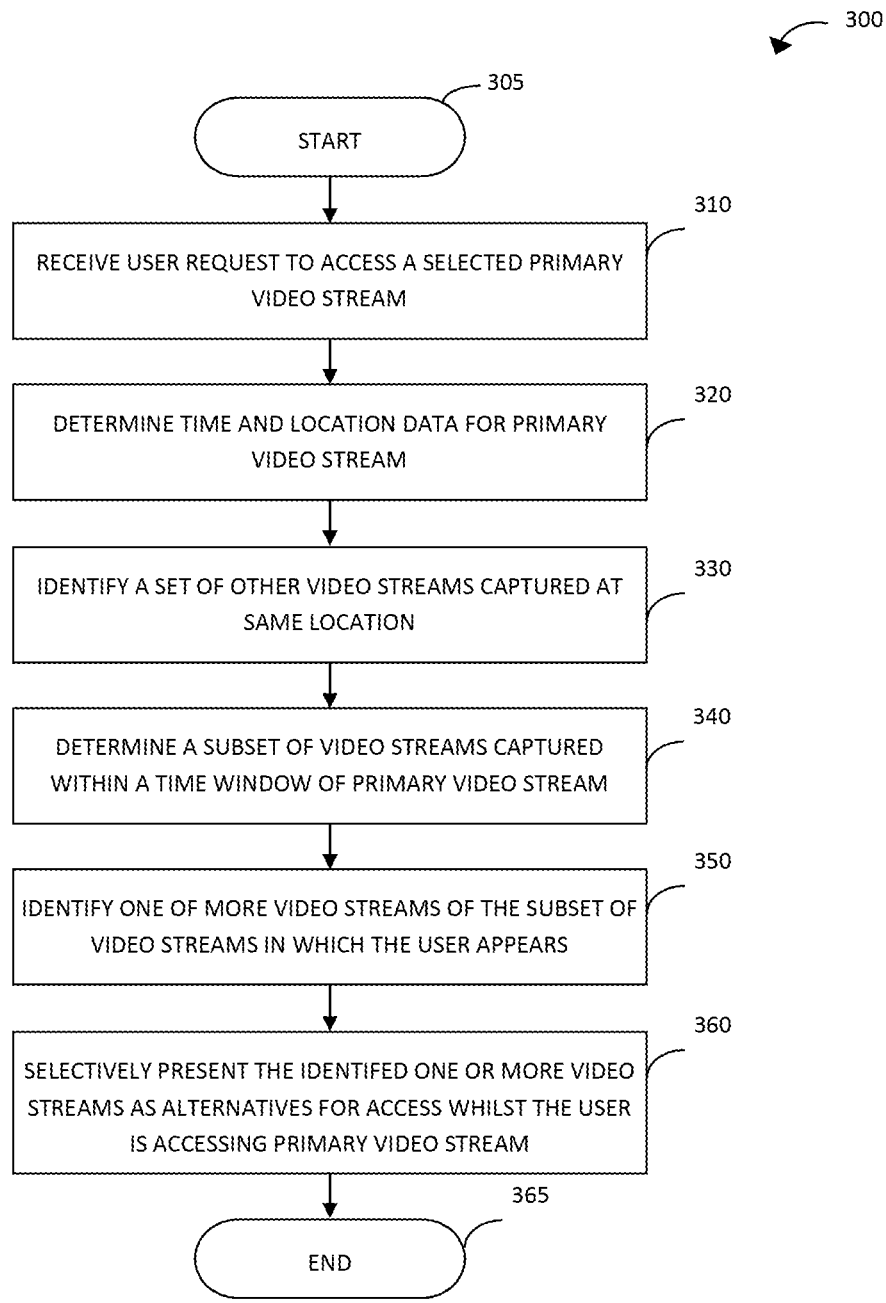
FIG. 3 is a flowchart of a method for providing a user with access to video data in accordance with example implementations of the present disclosure.

FIG. 3 is a flowchart of a method 300 for providing a user with access to video data in accordance with example implementations of the present disclosure. In particular, although not exclusively, method 300 may be performed by processing unit 130 in accordance with video hosting module 126 of the processing modules 122 of memory unit 120 of the video storage unit 110 of FIG. 1.

The method starts at step 305. At step 310, the method receives a request from a user to access a selected primary video stream, for example as part of a video hosting service. In particular, the request may include information identifying the primary video stream to be accessed, for example by user selection of a video from a menu or from search results of a plurality of video streams meeting the user's search criteria.

At step 320, the method determines the time and location of capture (i.e., filming) of the primary video stream. Typically, the time and location of capture is included in metadata associated with the video stream, which may be automatically added by the video capture device (e.g., video camera, smartphone, geolocation receiver) or manually added by the user who uploaded the video stream data to the video hosting service. Accordingly, step 320 may search the metadata associated with the primary video stream to determine the time and location.

At step 330, the method identifies a set of (at least one) other video streams captured at the same location. In some embodiments, two or more video streams are identified. For example, step 330 may search metadata of other video streams in a database of the video hosting service and identify a set of other video streams captured at the location of the primary video stream (e.g., within a defined distance range thereof).

At step 340, the method determines a subset of video streams, of the set of video streams identified in step 330, captured at least partly within a time window of the primary video stream. In example implementations, the time window may comprise a predefined time interval either side of the start and end times of the primary video stream. For example, step 340 may search metadata of the set of video streams identified in step 330 and determine, as the subset, those video streams that were captured at least partly within the time window of the primary data stream. In example implementations, the time range of capture of each of the video streams of the subset determined in step 340 at least partly overlaps with the time range of capture of the primary video stream.

At step 350, the method identifies one or more video streams, in the subset of video streams determined in step 340, in which the user appears. Typically, the user of a video hosting service provides user information (e.g., user ID) at the time of logging on to the service, and this identifying information may include, or be matched to, a facial recognition identifier (e.g., hashcode) for the user. Accordingly, step 350 may search the face tags contained in the metadata of each of the video streams in the subset to identify one or more video streams in which the user appears. In this way, step 350 identifies video streams that are contemporaneous in time and location to the primary video stream and include one or more frames in which the user appears.

At step 360, the method selectively presents the one or more video streams identified in step 350, as alternative video streams for access while the user is accessing the primary data stream. In example implementations, while the user is accessing the primary video stream, step 360 may present different alternative video streams for access, such as alternative video streams having respective frames in which the user appears at the same time as the currently accessed frame of the primary video stream. Step 360 may present the alternative video streams to the user in any suitable manner. For example, a frame of each alternative video stream and associated information may be presented in a menu bar or window adjacent the main window showing the primary video stream. As the skilled person will appreciate, other techniques for presenting alternative video streams to a user, as options for access, are possible and contemplated by the present disclosure. The method ends at step 365.

Steps 330 through 350 of the above-described method 300 together identify at least one other video stream, captured at substantially the same time and location as the primary video stream and in which a person specified in the user request appears, from which alternative video streams may be selectively presented to a user for access. As the skilled person will appreciate, steps 330 through 350 may be carried out in any other order according to application and/or user requirements. For example, step 340 may be modified to be performed as determining a set of video streams captured within a time window of a primary video stream, followed by a step 330 modified to be performed as identifying a subset, of the set, of video streams captured at the same location.

In the example implementations of FIG. 3, the method 300 identifies and selectively presents alternative video streams, in which the user requesting access to a primary video stream appears. In this way, users can switch to an alternative perspective of the video content in which they appear. As the skilled person will appreciate, in other example implementations, users may specify, in the user request or otherwise, another subject appearing in the primary video stream or the user who captured the video stream. In this case, the method may identify and selectively present alternative video streams, enabling users to switch to alternative perspectives in which the specified subject or user appears.

Figure 4:
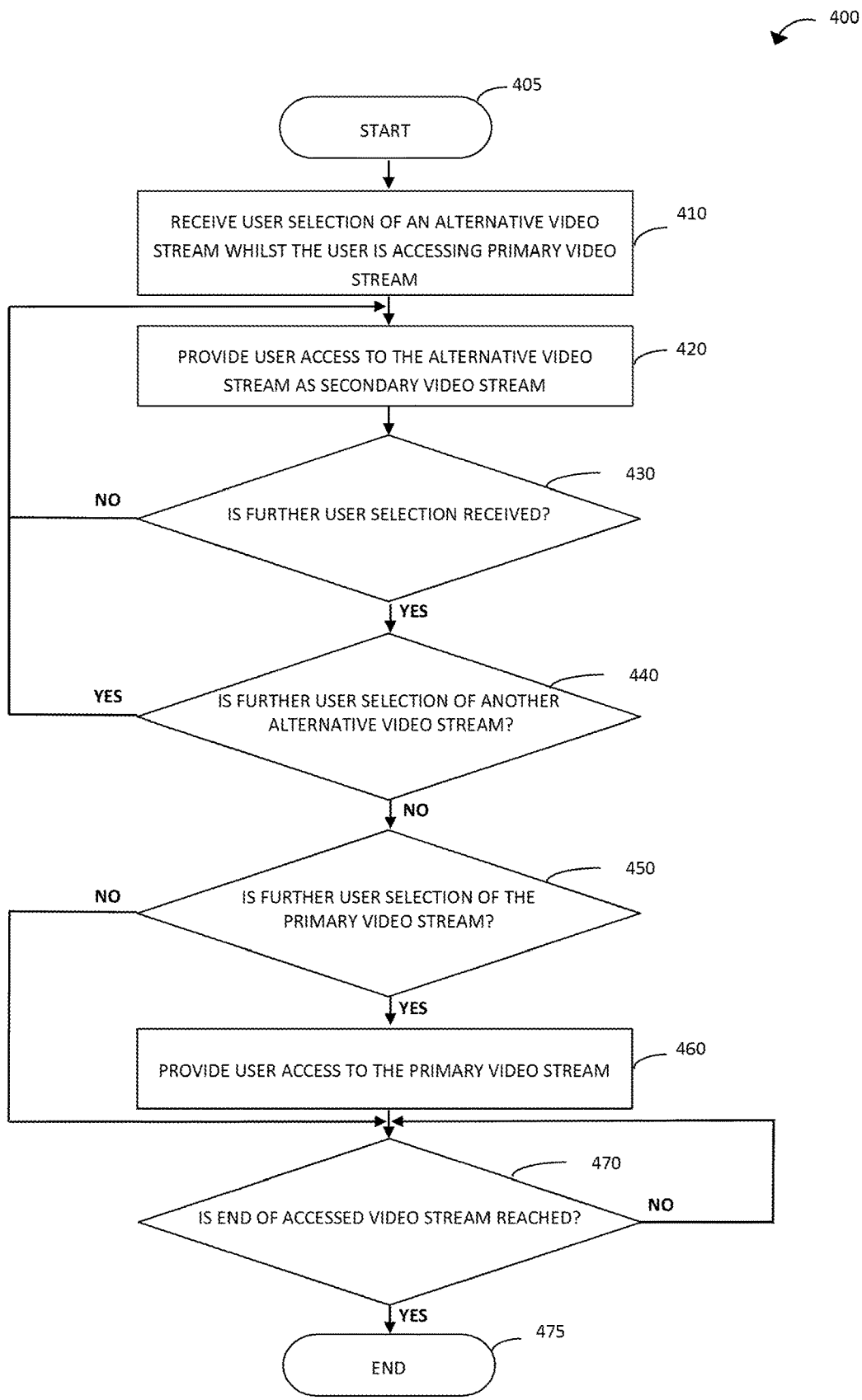
FIG. 4 is a flowchart of a method for switching between different perspectives of video data accessed by a user in accordance with example implementations of the present disclosure.

FIG. 4 is a flowchart of a method 400 for switching between different perspectives of video data accessed by a user in accordance with example implementations of the present disclosure. In particular, although not exclusively, method 400 may be performed by processing unit 130 in accordance with video hosting module 126, including alternative video selection module 128, of the processing modules 122 of memory unit 120 of the video storage unit 110 of FIG. 1. In example implementations, the method 400 may be performed in conjunction with the method 300 of FIG. 3.

The method 400 starts at step 405. For example, the method may start in response to the presentation to a user of a primary video stream, together with an option to access an alternative video stream, for example in accordance with step 360 of the method of FIG. 3.

At step 410, the method receives a user selection of an alternative video stream, while the user is accessing a primary video stream. For example, the user may select one of a plurality of alternative video streams presented by a video hosting service as options for access, while accessing (e.g., editing or playing) the primary video stream.

At step 420, the method provides the user with access to the selected alternative video stream as a secondary video stream. For example, the method may switch the user-accessed video stream from the primary video stream to the selected alternative video stream, thereby providing access to an alternative perspective of the video content. In example implementations, the primary video stream and the secondary video stream are synchronized in time, based on the time of capture of the respective video content. Thus, step 420 may switch to a video frame of the secondary video stream that substantially corresponds to the point in time of the video frame of the primary video stream accessed by the user at the time of selection. In this way, the user accesses chronologically sequential video content from the same time and location in different perspectives (i.e., a first perspective corresponding to the primary video stream and a second perspective corresponding to the secondary (i.e., selected alternative) video stream).

At step 430, the method determines whether a further user selection is received. For example, the user may select another one of the plurality of alternative video streams presented by the video hosting service as options for access or the primary video stream. If step 430 determines that no further user selection has been received, the method continues providing user access to the alternative video stream in step 420. However, if step 430 determines that a further user selection has been received, the method continues with step 440.

At step 440, the method determines whether the further user selection is a selection of another alternative video stream. If step 440 determines that the further user selection is a selection of another alternative video stream, the method returns to step 420. Step 420 then provides user access to the alternative video stream selected by the further user selection as a new secondary video stream, and thus yet another perspective of the video content, which may be synchronized in time with the previously accessed video stream, as described above. However, if step 440 determines that the further user selection is not a selection of another alternative video stream, the method continues with step 450.

At step 450, the method determines whether the further user selection is a selection of the primary video stream. For example, the user may select a "home" video stream, corresponding to the primary video stream, which may be presented as an option for access following switching to the alternative video stream in step 420. If step 450 determines that the further user selection is a selection of the primary video stream, the method continues with step 460. However, if step 450 determines that the further user selection is not a selection of the primary video stream, the method continues with step 470, as described below.

At step 460, the method provides user access to the primary video stream. For example, the method may switch the video stream from the user-accessed secondary video stream back to the primary video stream, thereby providing access to original perspective of the video content. In example implementations, the primary video stream and the secondary video stream are synchronized in time, based on the time of capture of the respective video content. Thus, step 460 may switch to a video frame of the primary video stream that substantially corresponds to the point in time of the video frame of the secondary video stream accessed by the user at the time of the selection.

At step 470, the method determines whether the end of the currently accessed video stream has been reached. If step 470 determines that the end of the currently accessed video stream has been reached, the method ends at step 475. If step 470 determines that the end of the currently accessed video stream has not been reached, the method may repeat step 470 (e.g., periodically) until the end is reached. In alternative example implementations, if step 470 determines that the end of the currently accessed video stream has been reached, the method may switch to another video stream that extends in time beyond the currently accessed video stream. Thus, for example, if the user reaches the end of a secondary video stream, the method may switch back to the primary video stream, or if the user reaches the end of the primary video stream, the method may switch to a selected alternative video stream.

As the skilled person will appreciate, the method 400 may restart by returning to step 410 in response to a new user selection of an option to access an alternative video stream, while the user is accessing the primary video stream in step 460. For example, as described above, as the user accesses different time periods of the primary video stream, different alternative video streams may be presented as options for access, which may be selected by the user to restart the method 400.

The method 400 of FIG. 4 enables a user, such as a person who captured a primary video stream of an event at a particular time and location, to easily switch from that first person perspective to other perspectives of the same event. In particular, users may be able to switch to perspectives that show themselves, and thus how they appear and their reactions (e.g., in social events or as part of sales, management or teaching training events). Moreover, a user may switch to alternative perspectives during editing, and combine together parts of different accessed video streams to form a new video stream sequence, which may be saved by the video hosting service.

In implementations, embodiments of the present invention present to the user the information, options, and video streams, etc. via display on a screen of a user device, such as a smartphone, tablet computer, or other suitable device. Similarly, data is received from the user, such as video streams and selections through the user interface through either tapping on a touch screen, keypad, buttons, etc.

Figure 5:
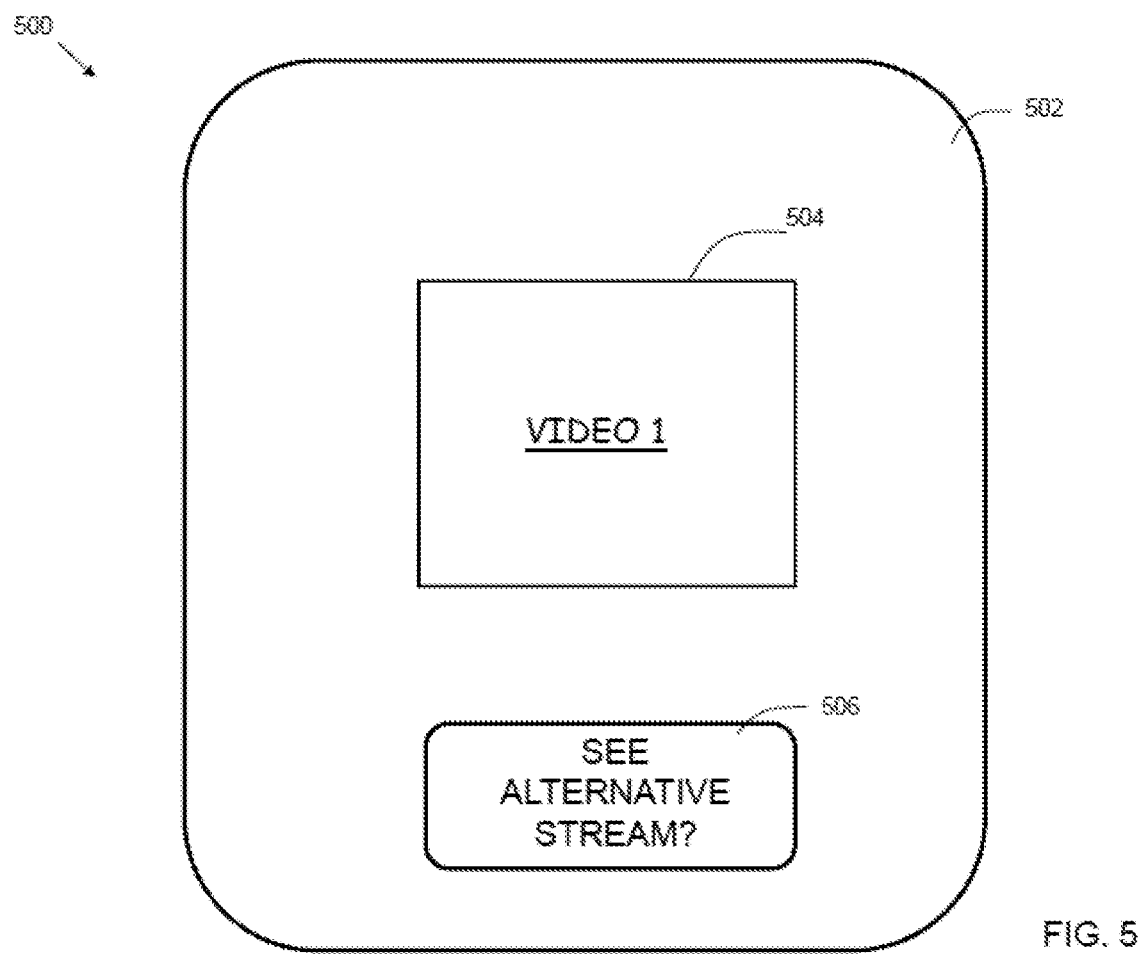
FIG. 5 is a diagram of an example user interface of a user device.

FIG. 5 shows a diagram 500 of an example user interface (screen) 502 of a user device. As shown, a first video 504 is shown on the screen. An option, shown as a button 506, is presented, which the user can select (e.g., with a finger or stylus on the touch-sensitive screen) to access an alternative stream.

FIG. 6 shows a diagram 600 of an example user interface (screen) 602 of a user device. As shown, a first video 604 is shown on the screen. A second video 605 is shown on the screen as well. This user interface is shown in response to a user selecting button 506 of FIG. 5. An option shown as a button 606 is presented, which the user can select (e.g., with a finger or stylus on the touch-sensitive screen) to access yet another alternative stream.

It should be recognized that the user interfaces shown herein are examples, and in implementations, the user interfaces may differ from the configuration shown. More, fewer, or different features may be included on the user interfaces. Additionally, the buttons may instead be radio buttons, check boxes, drop-down menus or any other suitable mechanism for receiving user input.

As the skilled person will appreciate, various modifications, changes and additions may be made to the methods of the example implementations described above with reference to FIGS. 2, 3 and 4. Moreover, the method 300 of FIG. 3 may identify other alternative video data streams, and present such alternative video streams as additional secondary video streams for access. For example, the method may additionally identify video streams having recent video footage of the user (or other specified person), which are not captured at the same time and/or location as the primary video stream access. This may enable access to video streams showing the user's face in more detail and/or from other perspectives, for example. In another example, the method may additionally identify other video streams captured at the same location. This may enable access to video streams of similar events on different days, for example.

The present disclosure encompasses a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some example implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to example implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various example implementations of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various example implementations of the present disclosure have been presented for purposes of illustration, but are not intended to be exhaustive or limited to the implementations disclosed. Many modifications and variations will be apparent to those of ordinary skill in the art without departing from the scope and spirit of the described example implementations. The terminology used herein was chosen to best explain the principles of the example implementations, the practical application or technical improvement over technologies found in the marketplace, or to enable others of ordinary skill in the art to understand the example implementations disclosed herein.

What is claimed is:

1. A method comprising:
    receiving, by at least one computing device, a user request, from a user, to access a primary video stream from a video hosting service, wherein the video hosting service comprises a database that includes video streams of captured video content uploaded by a plurality of users;
    searching, by the at least one computing device, metadata of video streams, other than the primary video stream, in the database of the video hosting service;
    identifying, by the at least one computing device based on the searching, video streams captured at a defined distance range of a location of the primary video stream;
    determining, by the at least one computing device, a subset of video streams from the identified video streams captured at least partially within a time window of the primary video stream, the time window comprising a predefined time interval on either side of a start time and an end time of the primary video stream;
    identifying, in the subset of video streams, based on a facial identifier in metadata associated with at least one video in the subset of video streams, at least one video stream in which a person specified in the user request appears;
    selecting, by the at least one computing device, from the identified at least one video stream in which the person specified in the user request appears, an alternative video stream;
    providing, by the at least one computing device, the user with access to the primary video stream, together with an option to access the alternative video stream;
    determining, by the at least one computing device, that an end of the primary video stream has been reached;
    switching, by the at least one computing device, in response to the determining that the end of the primary video stream has been reached, to a video frame of the alternative video stream that substantially corresponds to a point in time of a video frame of the primary video stream accessed by the user at the time of selection, wherein the alternative video stream extends in time beyond the primary video stream; and
    displaying, by the at least one computing device, the alternative video stream beginning at the switched-to video frame of the alternative video stream.

2. The method of claim 1, further comprising:
    determining, by the at least one computing device, from metadata associated with the primary video stream, the location at which the primary video stream was captured.

3. The method of claim 1, further comprising:
    determining, by the at least one computing device, from metadata associated with the primary video stream, a time window during which the primary video stream was captured.

4. The method of claim 3, wherein the metadata of an identified video stream at least partially overlaps the time range of the primary video stream.

5. The method of claim 1, further comprising:
    determining, by the at least one computing device, from the user request, a facial recognition identifier for the specified person.

6. The method of claim 5, wherein the facial recognition identifier is a facial recognition hashcode.

7. The method of claim 5, wherein the specified person is selected from the group consisting of: the user; a person who captured the primary video stream, and a person appearing in the primary video stream.

8. The method of claim 1, further comprising:
    receiving, by the at least one computing device, a user selection of the alternative video stream for access, while the user is accessing the primary video stream, and
    wherein the switching comprises providing, by the at least one computing device, the user with access to the alternative video stream.

9. The method of claim 8, wherein providing the user with access to the alternative video stream comprises:
    wherein the switching comprises providing, by the at least one computing device, the user with access to the alternative video stream starting from a video frame at a point in time that substantially corresponds to the point in time of the video frame of the primary video stream accessed by the user at a time of the selection.

10. A system comprising:
    a video hosting subsystem configured to access a database comprising a plurality of video streams, wherein the video hosting subsystem comprises a processor for processing data associated with the video streams and memory for storing data, wherein the processor is configured to:

receive a user request, from a user, to access a primary video stream from a video hosting service, wherein the video hosting service comprises the database that includes video streams of captured video content uploaded by a plurality of users;

search metadata of video streams, other than the primary video stream, in the database of the video hosting service;

identify, based on the searching, video streams captured at a defined distance range of a location of the primary video stream;

determine a subset of video streams from the identified video streams captured at least partially within a time window of the primary video stream, the time window comprising a predefined time interval on either side of a start time and an end time of the primary video stream;

identify, in the subset of video streams, based a facial recognition identifier in metadata associated with at least one video in the subset of video streams, at least one video stream in which a person specified in the user request appears;

select, from the identified at least one video stream in which the person specified in the user request appears, an alternative video stream;

provide the user with access to the primary video stream, together with an option to access the alternative video stream;

determine that an end of the primary video stream has been reached;

switch, in response to the determining that the end of the primary video stream has been reached, to a video frame of the alternative video stream that substantially corresponds to a point in time of a video frame of the primary video stream accessed by the user at the time of selection, wherein the alternative video stream extends in time beyond the primary video stream; and display the alternative video stream beginning at the switched-to video frame of the alternative video stream.

11. The system of claim 10, wherein the identifying comprises
determining, from metadata associated with the primary video stream, a location at which the primary video stream was captured.

12. The system of claim 10, wherein the identifying comprises determining, from metadata associated with the primary video stream, a time range during which the primary video stream was captured.

13. The system of claim 11, wherein the metadata of an identified video stream at least partially overlaps the time window of the primary video stream.

14. The system of claim 10, wherein the identifying comprises: determining, from the user request, the facial recognition identifier for the specified person.

15. The system of claim 14, wherein the specified person is selected from the group consisting of: the user; the person who captured the primary video stream, and a person appearing in the primary video stream.

16. The system of claim 10, wherein the processor is further configured to:

receive a user selection of the alternative video stream for access, while the user is accessing the primary video stream; and wherein the switching comprising providing the user with access to the alternative video stream.

17. The system of claim 16, wherein the processor is configured to provide the user with access to the alternative video stream by:

providing the user with access to the alternative video stream starting from a video frame at a point in time that substantially corresponds to the point in time of the video frame of the primary video stream accessed by the user at the time of the selection.

18. The system of claim 10, wherein the video hosting subsystem comprises:
a database comprising video streams and facial recognition identifiers, and
a server of a video hosting service, the server configured to access the database.

19. The system of claim 18, further comprising:
a face tagging subsystem, wherein the face tagging subsystem is configured to:
receive video stream data and associated metadata from a user of the video hosting service;
perform face tagging of frames in the received video stream; and
store the tagged video stream data together with the associated metadata in the database.

20. A computer program product comprising a computer readable hardware storage device having program instructions embodied therewith, wherein the program instructions are executable by a processor to cause the processor to:

receive a user request, from a user, to access a primary video stream from a video hosting service, wherein the video hosting service comprises a database that includes video streams of captured video content uploaded by a plurality of users;

search metadata of video streams, other than the primary video stream, in the database of the video hosting service;

identify, based on the searching, video streams captured at a defined distance range of a location of the primary video stream;

determine a subset of video streams from the identified video streams captured at least partially within a time window of the primary video stream, the time window comprising a predefined time interval on either side of a start time and an end time of the primary video stream;

identify, in the subset of video streams, based on face tags in metadata associated with at least one video in the subset of video streams, at least one video stream in which a person specified in the user request appears;

select, from the identified at least one video stream in which the person specified in the user request appears, an alternative video stream;

provide the user with access to the selected primary video stream, together with an option to access the alternative video stream;

determine that an end of the primary video stream has been reached;

switch, in response to the determining that the end of the primary video stream has been reached, to a video frame of the alternative video stream that substantially corresponds to a point in time of a video frame of the primary video stream accessed by the user at the time of selection, wherein the alternative video stream extends in time beyond the primary video stream; and display the alternative video stream beginning at the switched-to video frame of the alternative video stream.

* * * * *